Patented Mar. 31, 1942

2,278,166

UNITED STATES PATENT OFFICE 2,278,166

PROCESS FOR BREAKING PETROLEUM EMULSIONS

Melvin De Groote, University City, and Bernhard Keiser, Webster Groves, Mo., assignors to Petrolite Corporation, Ltd., Wilmington, Del., a corporation of Delaware No Drawing. Application January 25, 1941, Serial No. 375,976

8 Claims. (Cl. 252—333)

This invention relates primarily to the resolution of petroleum emulsions.

One object of our invention is to provide a novel process for resolving petroleum emulsions of the water-in-oil type, that are commonly referred to as "cut oil," "roily oil," "emulsified oil," etc., and which comprise fine droplets of naturally-occurring waters or brines dispersed in a more or less permanent state throughout the oil which constitutes the continuous phase of the emulsion.

Another object is to provide an economical and rapid process for separating emulsions which have been prepared under controlled conditions from mineral oil, such as crude petroleum and relatively soft waters or weak brines. Controlled emulsification and subsequent demulsification under the conditions just mentioned is of significant value in removing impurities, particularly inorganic salts, from pipeline oil.

The chemical compound or composition of matter herein described that is employed as the demulsifier of our process, is a new material, representing a sub-genus of a broad class of sulfation derivatives which may be in the form of an ester, a salt, or an acid, but preferably, in one of the two last mentioned forms. If a high molal sulfonic acid be indicated by the conventional formula:

R.SO₃H then a hydroxylated ester which may actually have more than one hydroxyl group in the radical which replaces the sulfonic acid hydrogen atom, may be indicated by the following formula:

R.SO₃TOH

If such ester, for instance, the ester derived from ethylene glycol, is treated with sulfuric acid, one then can obtain a sulfate of the sulfonic acid ester, as indicated in the following manner:

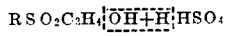

The neutralization product derived therefrom by the use of ammonium hydroxide, for example, may be indicated by the following formula:

RSO₃C₂H₄SO₄NH₄

A material of the kind above described illustrates the compounds herein contemplated with certain added provisos:

(a) That the sulfonic acid in the form of a salt or acid be surface-active, as subsequently defined;

(b) That the ester derived therefrom prior to sulfation be water-insoluble; and (c) That the sulfonic acid be a green petroleum sulfonic acid.

The compounds herein described are derivatives of surface-active sulfonic acids which, in the case of green petroleum sulfonic acids, are essentially water-soluble.

By "surface-active" it is intended to mean that a relatively dilute solution of alkali metal salts, for instance, the sodium or potassium salt and also the ammonium salt, in a solution containing a few tenths of a percent or thereabouts, will show a marked lowering of the static surface tension in comparison with distilled water. Usually, the acids themselves show the same surface-active property as the salts.

Although the types of compounds employed as the demulsifier in the present process are new chemical products, certain of the raw materials used in the manufacture of said chemical products, to wit, green petroleum sulfonic acids, are well known compositions of matter. However, as they may be derived in a variety of ways and may show a difference in degree, reference is herein made to suitable means for obtaining green petroleum sulfonic acids, particularly adapted as raw materials in the manufacture of compounds of the kind herein contemplated.

It is obvious that the procedure herein employed need not be limited to the green petroleum sulfonic acids, but may be employed in connection with other surface-active sulfonic acids, such as fatty sulfonic acids, fatty aromatic sulfonic acids, alkylaryl sulfonic acids, and the like. Such broad aspect is contemplated in our co-pending application, Serial No. 375,974, filed January 25, 1941, in which there is detailed description of a large variety of acceptable types of sulfonic acids which may be employed as reactants to produce compounds analogous to the particular specie or sub-genus herein contemplated.

The present invention relates to a sub-genus of the broad class just described. It is concerned only with water-soluble sulfonic acids of the kind commonly referred to as green sulfonic acids. Green sulfonic acids are often produced along with mahogany sulfonic acids. For this reason it appears most convenient to refer to the production of both types of sulfonic acids, even though the present invention contemplates only a compound derived from the green acid type.

The conventional refining treatment of certain lubricating oil distillates derived from petroleum, white oils, certain raffinates, etc. includes the application of fuming sulfuric acid. This reacts with the oil or similar body, producing a black sludge containing unreacted sulfuric acid and certain types of sulfonic acids. Though the concentration of SO3 in the fuming acid may vary considerably, a 20 percent fuming acid is employed in a majority of cases. As a result of the high degree of sulfonation obtained in the acid treatment, a considerable amount of sulfonic acids is produced. These are principally of two types, i. e., the so-called water-soluble type predominantly contained in the sludge, and the so-called oil-soluble type predominantly found in the oil to the extent of a few percent or more. The acid application is regulated in the manner well known in the art to produce the desired sulfonation reaction, and in general temperatures not exceeding 140° F. are preferred. The acids contained in the sludge, while limitedly soluble, if at all, in hydrocarbon oils, are highly water-soluble, imparting to their aqueous solution a dark green or gray-green color and being for this reason generally referred to as "green petroleum sulfonic acids." Such acids are also known as sludge layer acids, sludge acids, or water-soluble petroleum sulfonic acids. The acids left in solution in the oil impart a reddish color to the oil, and for this reason, or possibly for other reasons, are generally referred to as "mahogany petroleum sulfonic acids." They are also known as oil layer petroleum sulfonic acids or oil-soluble petroleum sulfonic acids. After the separation of the oil from the acid sludge, the mahogany sulfonic acids are removed from the oil either directly as such, in accordance with the method described in U. S. Patent No. 2,050,345, to Liberthson, dated August 11, 1936, or by the ordinary refining method comprising conversion of the acids into salts by direct neutralization of the acid-treated oil followed by suitable extraction.

Green acids are usually marketed in the form of salts because they can be handled most conveniently without corrosion of the container. Such salts can readily be converted into the corresponding acids by any convenient means, and particularly by methods previously indicated. In the present instance the compound herein contemplated, and particularly for use as a demulsifier, is derived from the anhydrous acid. Thus, any method for yielding the free acid may be such that the acid is obtained in an anhydrous state, or else must be converted to the anhydrous state by any conventional means, as, for example, the methods hereinafter described. Particular attention is directed to U. S. Patent No. 2,125,300, dated August 2, 1938, to Kessler and Salzmann. This patent describes a method of preparing substantially pure free mahogany sulfonic acids. The same principle is applicable to green acids. As to other patents which are of interest in the preparation of petroleum sulfonic acids, attention is directed to the following U. S. Patents, to wit:

No. 2,115,843. dated May 3, 1938, to Dawson; 2,158,680, dated May 16, 1939, to Retailliau; 2,166,117, dated July 18, 1939, to Blumer; 2,168,315, dated Aug. 8, 1939, to Blumer; 2,188,770, dated Jan. 30, 1940, to Robertson; 2,201,119, dated May 14, 1940, to Blumer et al.; 2,203,441, dated June 4, 1940, to Oliver; 2,203,443, dated June 4, 1940, Ross; 2,203,440, dated June 4, 1940, to Oliver; 2,209,445, dated July 30, 1940, to de Mering.

The method of manufacturing hydroxylated esters of sulfonic acids is well known, although direct reaction between a sulfonic acid and a polyhydric alcohol such as ethylene glycol is not applicable for the reason that one obtains little or no yield of the hydroxylated ester. One procedure contemplates the conversion of sulfonic acids into the sulfonchloride, and subsequently, reacting the sulfonchloride with the polyhydric alcohol with the liberation of hydrochloric acid. Another procedure involves reaction between the sulfonic acid, or preferably, a salt, such as the sodium salt, and a chlorohydrin, such as ethylene glycol chlorohydrin.

The preferred way of preparing such materials is to use the procedure described in U. S. Patent No. 2,208,581, dated July 23, 1940, to Hoeffelmann. Briefly stated, the procedure employed is to obtain a free sulfonic acid in an anhydrous state and treat with a compound containing an ethylene oxide radical. As typical examples of applicable compounds may be mentioned glycerine epichlorhydrin, glycide alcohol, ethylene oxide, propylene oxide, butene-2-oxide, butene-1-oxide, isobutylene oxide, butadiene oxide, butadiene dioxide, chloroprene oxide, isoprene oxide, decene oxide, styrene oxide, cyclohexylene oxide, cyclopentene oxide, etc.

Note, however, that there are certain differences between the procedure employed for the manufacture of the intermediate raw material and the procedure as employed in said aforementioned Hoeffelmann patent. The Hoeffelmann method contemplates treatment of sulfonic acids, which are not necessarily surface-active, for instance, benzene-sulfonic acid, with an olefine oxide, so as to produce materials, which, for the main part, are water-soluble and surface-active. It happens that invariably the esters of the high molal sulfonic acids are insoluble in absence of a recurring ether linkage. In order to obtain compounds of the kind herein contemplated, one must stop treatment with the olefine oxide, i. e., oxyalkylation, before water solubility is obtained; and furthermore, it is desirable to stop water solubility at the earliest stage. In other words, the olefine oxide employed, whether ethylene oxide, propylene oxide, butylene oxide, glycidol, methyl glycidol, or the like, is a comparatively expensive reagent; and one is only concerned with obtaining a reactive hydroxyl radical for a subsequent sulfation step. There is no objection to the presence of a recurring ether linkage, provided that the ester is still water-insoluble. This may be illustrated in the following manner, using ethylene oxide as the reactant:

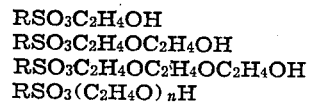

One is interested primarily in obtaining a material of the following type:

But materials illustrated by any of the three subsequent types:

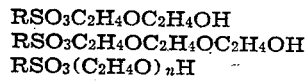

are just as satisfactory, provided that the ester, prior to sulfation is water-insoluble. In some instances the presence of the recurring ether linkage may give some added desirable characteristic. Ordinarily speaking, one is concerned only with minimum reactant cost; and thus the use of an excess amount of the olefine oxide is not justified. One is not attempting to obtain water solubility by means of the expensive oxyalkylation step. As has been emphasized, the ester obtained must be water-insoluble, regardless of how much or how little alkylene oxide is employed. Generally speaking, 40 moles of alkylene oxide per mole of sulfonic acid may be considered as an upper limit, but obviously, solubility is influenced by the alkylene oxide employed. Butylene oxide naturally will not cause a sulfonic acid to be converted into a water-soluble ester as readily as ethylene oxide.

Thus, having obtained hydroxylated water-insoluble esters—and they may be hydroxylated and may or may not contain the recurring ether linkage—the next step is to submit them to a conventional sulfation process. The sulfation of such materials is the conventional procedure employed for the sulfation of fatty acids or fats containing the hydroxyl radical or ethylene linkage, such as oleic acid, olein, ricinoleic acid, triricinolein, monostearin, and the like. A similar procedure is employed in the sulfation of amides derived from fatty acids of hydroxylated amines, such as the stearic acid amide and monoethanolamine. A similar procedure is employed in connection with the sulfation of high molal alcohols and other similar materials.

Briefly stated, the procedure consists in treating the material with the amount of sulfating agent at least molecularly equal to the material to be sulfated; and usually the sulfating agent is employed in considerable excess, for instance, from 50% excess to 200% excess, based on molal proportions. Sulfating agents include sulfuric acid of commerce, monohydrate, oleum of various strengths, chlorosulfonic acid, sulfamic acid, etc. Sulfonation is generally conducted at a relatively low temperature, from approximately zero degrees centigrade to a temperature of 35–40° C. or thereabouts. Sulfation can be conducted in presence of a solvent, such as liquid sulfur dioxide, chlorinated hydrocarbons, dioxane, ethyl ether, propyl ether, etc. Sometimes it is desirable to add materials which tend to take up any water which may be formed, such as organic anhydrides, including acetic anhydride. When sulfation is complete, which is usually indicated by absolutely clear solubility of the sulfated product, it is generally washed immediately so as to remove the excess sulfating agent. Washing is generally conducted with cold water, chilled brine, or ice. The sulfated material is permitted to separate and the dilute draw-off acid withdrawn. The sulfated mass may be employed as such, or may be neutralized in any convenient manner with any one of the conventional basic materials frequently employed, such as caustic soda, caustic potash, ammonia, various hydroxylated amines, including monoethanolamine, diethanolamine, triethanolamine; and non-hydroxylated amines, including amylamine, benzylamine, cyclohexylamine, and the like. Such materials may be neutralized with polyvalent compounds, such as calcium oxide, magnesium oxide, polyamines, including ethylene diamine, diethylene triamine, triethylene tetramine, etc.

*Example 1*

Green acids are obtained from a Gulf Coast lubricating oil distillate having an S. U. viscosity at 100° F. of about 400 seconds. The procedure employed is that described in the aforementioned Robertson Patent No. 2,188,770. The material, so obtained, contains considerable moisture and must be dehydrated by any conventional procedure, such as a vacuum drier, or by means of xylene or a similar high boiling solvent. The amount of solvent employed may be several times the volume of sulfonate. Such xylene is distilled off and carries with it any moisture or water present. The vapors are condensed and the water separated from the xylene. The xylene can be returned to the sulfonated mass being hydrated so as to permit a continuous process in which the xylene is used repeatedly. When the sulfonation mass is reduced to a substantially anhydrous state, the xylene is distilled off, unless it is desired that a small amount be present so as to yield a fluid sulfonated mass for subsequent reaction. The anhydrous sulfonic acid so obtained in the presence or absence of a selected inert solvent is reacted with one to three moles of ethylene oxide in the manner described in the aforementioned Hoeffelmann Patent No. 2,208,581, so as to yield a water-insoluble ester; such ester is sulfated in the conventional manner employed for such type of material with approximately 65% by weight of monohydrate. The sulfonation is most conveniently conducted in apparatus designed to mix even solid materials with the sulfonating agent. A sulfation temperature of approximately 35–45° C. is employed. The acid is added as rapidly as possible, and as a rule, sulfation can be completed within 2–4 hours. When sulfation is complete, the acid mass should give an absolutely clear, limpid, solution in water. Failure to obtain such clearly soluble sulfated mass is due to either over-sulfation or under-sulfation. Over-sulfation means that the period of sulfation is too long and decomposition of the sulfated material took place progressively with sulfation. In such case, it is probable that the period of sulfation should be decreased somewhat. Under-sulfation can be corrected by increasing the volume of sulfating agent or increasing its activity, for instance, using a mixture of oleum and monohydrate, or else perhaps, extending the period of sulfation slightly. As is understood by those skilled in the art, such sulfation procedure depends on the particular sulfating agent employed; and there is no difficulty in varying these factors so as to obtain absolutely water-soluble properties. When sulfation is complete, the mass is washed with cold water, or preferably, with a mixture of chipped ice and water. The amount of water added is preferably equal to the amount of sulfating agent added. The mixture is stirred and allowed to stand the minimum length of time necessary to give a complete separation. Sometimes separation is hastened by the use of a chilled brine instead of water, or by the addition of a solvent, particularly if such solvent is not objectionable in the final product. Such solvent may be a material of the kind exemplified by xylene, kerosene, propyl ether, and the like. After separation is complete, the waste acid is withdrawn and the acid mass neutralized in any convenient manner. Generally speaking, it is our preference to neutralize with ammonia to slightly past the methyl orange endpoint, i. e., until the material shows just the slightest basicity. The product so obtained may be employed for various purposes, and particularly, for demulsification.

*Example 2*

The same procedure is followed as in Example 1, but instead, the green acids are obtained from Gulf Coast transformer oil extract in the manner described in the aforementioned Ross and Mitchell Patent No. 2,203,443.

*Example 3*

The same procedure is followed as in Example 2, except that California 65 Saybolt viscosity Edeleanu extract is employed instead of Gulf Coast transformer oil Edeleanu extract employed in Example 2.

*Example 4*

The same procedure is followed as in Example 1, except that the product is made from a Gulf Coast naphthene type crude preferably of the kind which has little or no low boiling fraction, i. e., the kind which on a straight-run distillation, gives little or no gasoline.

*Example 5*

The same procedure is followed as in Examples 1-4, inclusive, except that an amine of the kind exemplified by monoamylamine, cyclohexylamine, or benzylamine is used as a neutralizing agent instead of ammonia.

It is to be noted that the last example illustrates a type in which the compounds obtained are water-insoluble. Such water-insoluble types are particularly adaptable for many purposes, and in fact, in many instances are just as desirable, or even more desirable, for demulsification of certain crude oils than are the corresponding water-soluble types.

It is understood that in all the previous examples, as has been emphasized, the sulfonic acid employed is anhydrous, or substantially anhydrous. Any suitable method may be employed for drying the sulfonic acid, as, for example, a vacuum evaporator of the proper design; or the material may be mixed with a comparatively high boiling solvent, such as xylene, which can be distilled off in a manner to carry along the water, and subsequently permit the combined vapors of xylene and water to be condensed. The condensed xylene is returned to the distillation vessel and the water eliminated by a trap. This is a conventional process and requires no further description. In the sulfation step it has been previously pointed out that a solvent may be employed, particularly if the material employed is substantially solid at the sulfation temperature. A class of very suitable solvents includes the chlorinated alkanes, such as chloroform, carbon tetrachloride, trichlorethylene, dichloropentane, etc. Incidentally, in some instances, particularly where glycidol is used for oxyalkylation, one may obtain an ester in which more than one acid sulfate radical is introduced.

Conventional demulsifying agents employed in the treatment of oil field emulsions are used as such, or after dilution with any suitable solvent, such as water; petroleum hydrocarbons, such as gasoline, kerosene, stove oil, a coal tar product, such as benzene, toluene, xylene, tar acid oil, cresol, anthracene oil, etc. Alcohols, particularly aliphatic alcohols, such as methyl alcohol, ethyl alcohol, denatured alcohol, propyl alcohol, butyl alcohol, hexyl alcohol, octyl alcohol, etc., may be employed as diluents. Miscellaneous solvents, such as pine oil, carbon tetrachloride, sulfur dioxide extract obtained in the refining of petroleum, etc., may be employed as diluents. Similarly, the material or materials herein described, may be admixed with one or more of the solvents customarily used in connection with conventional demulsifying agents. Moreover, said material or materials may be used alone, or in admixture with other suitable well known classes of demulsifying agents.

It is well known that conventional demulsifying agents may be used in a water-soluble form, or in an oil-soluble form, or in a form exhibiting both oil and water solubility. Sometimes they may be used in a form which exhibits relatively limited oil solubility. However, since such reagents are sometimes used in a ratio of 1 to 10,000, or 1 to 20,000, or even 1 to 30,000, such an apparent insolubility in oil and water is not significant, because said reagents undoubtedly have solubility within the concentration employed. This same fact is true in regard to the material or materials herein described.

We desire to point out that the superiority of the reagent or demulsifying agent contemplated in our herein described process for breaking petroleum emulsions, is based upon its ability to treat certain emulsions more advantageously and at a somewhat lower cost than is possible with other available demulsifiers, or conventional mixtures thereof. It is believed that the particular demulsifying agent or treating agent herein described will find comparatively limited application, so far as the majority of oil field emulsions are concerned; but we have found that such a demulsifying agent has commercial value, as it will economically break or resolve oil field emulsions in a number of cases which cannot be treated as easily or at so low a cost with the demulsifying agents heretofore available.

In practising our process, a treating agent or demulsifying agent of the kind above described is brought into contact with or caused to act upon the emulsion to be treated, in any of the various ways, or by any of the various apparatus now generally used to resolve or break petroleum emulsions with a chemical reagent, the above procedure being used either alone or in combination with other demulsifying procedure, such as the electrical dehydration process.

The demulsifier herein contemplated may be employed in connection with what is commonly known as down-the-hole procedure, i. e., bringing the demulsifier in contact with the fluids of the well at the bottom of the well, or at some point prior to their emergence. This particular type of application is decidedly feasible when the demulsifier is used in connection with acidification of calcareous oil-bearing strata, especially if suspended in or dissolved in the acid employed for acidification.

In the hereto appended claims, the word "acyl" is used in reference to the radical $RSO_2$; i. e., one can conveniently consider the sulfonic acid $RSO_3H$ in terms of a formula indicating part of its structure, to wit, $R.SO_2.OH$.

In the hereto appended claims the words "polyhydric alcohol" are used in the conventional sense to include not only materials of the type exemplified by glycerol and ethylene glycol, but also materials of the kind in which the carbon atom chain is interrupted at least once by an oxygen atom, as, for example, diethylene glycol, diglycerol, etc.

It may be well to emphasize that the compounds of the kind herein contemplated may be manufactured by any suitable method; and it is not intended to limit the compounds to any particular method of manufacture. When manufactured by the use of an alkylene oxide, it is our preference to use ethylene oxide, propylene oxide, or butylene oxide.

It is to be noted that the sulfato sulfonates and the sulfato sulfonic acids referred to in the claims are surface active in the same sense that sulfonic acids themselves are surface-active. Furthermore, it is to be noted that some sulfonic acids might be of the polysulfonic acid type, i. e., as exemplified by disulfonic acids. There is no objection to the use of such raw materials as reactants, and it is obvious that such procedure presents a means by which one obtains an ester in which either one or both terminal hydroxyl radicals may be sulfated.

It is understood that the petroleum sulfonic acids herein contemplated as reactants for the production of the chemical compound or demulsifier contemplated may be derived from paraffin base crudes, naphthene base crudes, aromatic base crudes, or mixed types representing two or more of the aforementioned classes.

Having thus described our invention, what we claim as new and desire to secure by Letters Patent is:

1. A process for breaking petroleum emulsions of the water-in-oil type, characterized by subjecting the emulsion to the action of a demulsifier comprising a sulfato sulfonate derived from a polyhydric alcohol in which one hydroxy hydrogen atom has been replaced by the acyl radical of a green petroleum sulfonic acid; and another hydroxy hydrogen atom of said polyhydric alcohol has been replaced by the linkage:

which in turn is united with a cation; said compound being further characterized by the fact that the selected sulfonic acid and selected polyhydric alcohol must be such that the hydroxylated ester derived by replacing one hydroxy hydrogen atom of the aforementioned polyhydric alcohol by the aforementioned acyl radical is water-insoluble.

2. A process for breaking petroleum emulsions of the water-in-oil type, characterized by subjecting the emulsion to the action of a demulsifier comprising a water-soluble sulfato sulfonate derived from a polyhydric alcohol in which one hydroxy hydrogen atom has been replaced by the acyl radical of a green petroleum sulfonic acid; and another hydroxy hydrogen atom of said polyhdric alcohol has been replaced by the linkage:

which in turn is united with a cation; said compound being further characterized by the fact that the selected sulfonic acid and selected polyhydric alcohol must be such that the hydroxylated ester derived by replacing one hydroxy hydrogen atom of the aforementioned polyhydric alcohol by the aforementioned acyl radical is water-insoluble.

3. A process for breaking petroleum emulsions of the water-in-oil type, characterized by subjecting the emulsion to the action of a demulsifier comprising a water-soluble sulfato sulfonate derived from an aliphatic polyhydric alcohol in which one hydroxy hydrogen atom has been replaced by the acyl radical of a green petroleum sulfonic acid; and another hydroxy hydrogen atom of said polyhydric alcohol has been replaced by the linkage:

which in turn is united with a cation; said compound being further characterized by the fact that the selected sulfonic acid and selected polyhydric alcohol must be such that the hydroxylated ester derived by replacing one hydroxy hydrogen atom of the aforementioned polyhydric alcohol by the aforementioned acyl radical is water-insoluble.

4. A process for breaking petroleum emulsions of the water-in-oil type, characterized by subjecting the emulsion to the action of a demulsifier comprising a neutral water-soluble sulfato sulfonate derived from an aliphatic polyhydric alcohol in which one hydroxy hydrogen atom has been replaced by the acyl radical of a green petroleum sulfonic acid; and another hydroxy hydrogen atom of said polyhydric alcohol has been replaced by the linkage:

which in turn is united with a cation; said compound being further characterized by the fact that the selected sulfonic acid and selected polyhydric alcohol must be such that the hydroxylated ester derived by replacing one hydroxy hydrogen atom of the aforementioned polyhydric alcohol by the aforementioned acyl radical is water-insoluble.

5. A process for breaking petroleum emulsions of the water-in-oil type, characterized by subjecting the emulsion to the action of a demulsifier comprising a neutral water-soluble sulfato sulfonate derived from an aliphatic polyhydric alcohol in which one hydroxy hydrogen atom has been replaced by the acyl radical of a green petroleum sulfonic acid; and another hydroxy hydrogen atom of said polyhydric alcohol has been replaced by the linkage:

which in turn is united with a cation; said compound being further characterized by the fact that the selected sulfonic acid acid and selected polyhydric alcohol must be such that the hydroxylated ester derived by replacing one hydroxy hydrogen atom of the aforementioned polyhydric alcohol by the aforementioned acyl radical is water-insoluble; said aliphatic polyhydric alcohol being characterized by the fact that the hydrocarbon radical present contains at least two carbon atoms and not more than six carbon atoms.

6. A process for breaking petroleum emulsions of the water-in-oil type, characterized by subjecting the emulsion to the action of a demulsifier comprising a neutral water-soluble sulfato sulfonate derived from an aliphatic polyhydric alcohol in which one hydroxy hydrogen atom has been replaced by the acyl radical of a paraffin type green petroleum sulfonic acid; and another hydroxy hydrogen atom of said polyhydric alcohol has been replaced by the linkage:

which in turn is united with a cation; said compound being further characterized by the fact that the selected sulfonic acid and selected polyhydric alcohol must be such that the hydroxylated ester derived by replacing one hydroxy hydrogen atom of the aforementioned polyhydric alcohol by the aforementioned acyl radical is water-insoluble; said aliphatic polyhydric alcohol being characterized by the fact that the hydrocarbon radical present contains at least two carbon atoms and not more than six carbon atoms.

7. A process for breaking petroleum emulsions of the water-in-oil type, characterized by subjecting the emulsion to the action of a demulsifier comprising a neutral water-soluble sulfato sulfonate derived from an aliphatic polyhydric alcohol in which one hydroxy hydrogen atom has been replaced by the acyl radical of a naphthene type green petroleum sulfonic acid; and another hydroxy hydrogen atom of said polyhydric alcohol has been replaced by the linkage:

which in turn is united with a cation; said compound being further characterized by the fact that the selected sulfonic acid and selected polyhydric alcohol must be such that the hydroxylated ester derived by replacing one hydroxy hydrogen atom of the aforementioned polyhydric alcohol by the aforementioned acyl radical is water-insoluble; said aliphatic polyhydric alcohol being characterized by the fact that the hydrocarbon radical present contains at least two carbon atoms and not more than six carbon atoms.

8. A process for breaking petroleum emulsions of the water-in-oil type, characterized by subjecting the emulsion to the action of a demulsifier comprising a neutral water-soluble sulfato sulfonate derived from an aliphatic polyhydric alcohol in which one hydroxy hydrogen atom has been replaced by the acyl radical of a mixed type green petroleum sulfonic acid; and another hydroxy hydrogen atom of said polyhydric alcohol has been replaced by the linkage:

which in turn is united with a cation; said compound being further characterized by the fact that the selected sulfonic acid and selected polyhydric alcohol must be such that the hydroxylated ester derived by replacing one hydroxy hydrogen atom of the aforementioned polyhydric alcohol by the aforementioned acyl radical is water-insoluble; said aliphatic polyhydric alcohol being characterized by the fact that the hydrocarbon radical present contains at least two carbon atoms and not more than six carbon atoms.

MELVIN DE GROOTE.
BERNHARD KEISER.